UNITED STATES PATENT OFFICE.

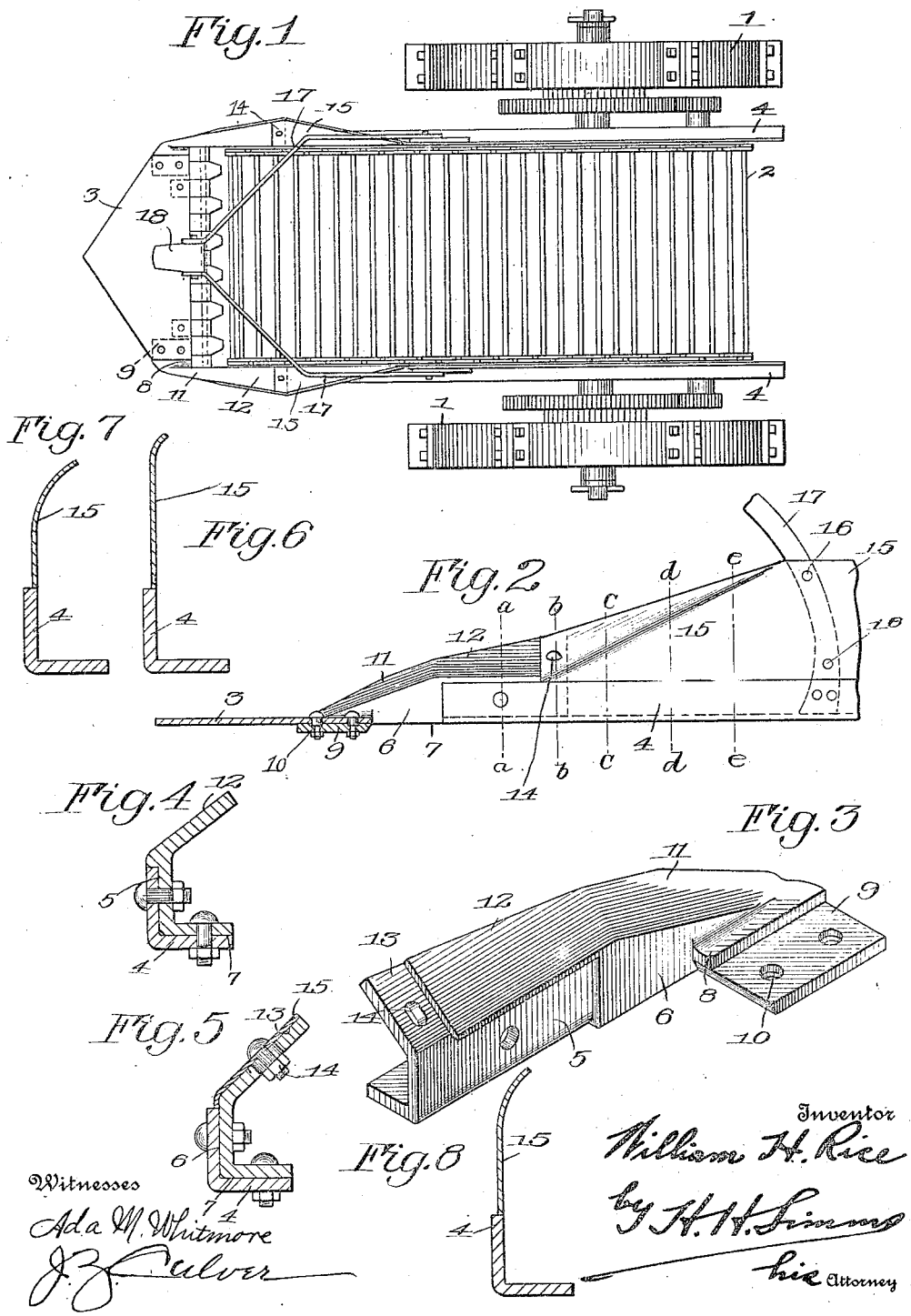

WILLIAM H. RICE, OF ROCHESTER, NEW YORK.

POTATO-DIGGER.

1,076,150.   Specification of Letters Patent.   Patented Oct. 21, 1913.

Application filed October 11, 1912. Serial No. 725,182.

*To all whom it may concern:*

Be it known that I, WILLIAM H. RICE, of Rochester, in the county of Monroe and State of New York, have invented a new and useful Improvement in Potato-Diggers, which improvement is fully set forth in the following specification and shown in the accompanying drawings.

The present invention relates to potato diggers and more particularly to the type which has a shovel arranged to collect the potatoes, dirt and vines to deliver the same into the machine for the purpose of separating the potatoes from the dirt and vines, and an object of this invention is to so construct the throat or forward end of the machine that it will permit the vines to readily enter the machine without packing or jamming in the throat.

Another object of the invention is to simplify the construction of the throats of potato diggers for the purpose of rendering the same less expensive to manufacture and less liable to get out of order.

To these and other ends the invention consists in certain parts and combinations of parts all of which will be hereinafter described, the novel features being pointed out in the appended claims.

In the drawings: Figure 1 is a top view of a potato digger with portions thereof, which do not relate to the present improvements, removed; Fig. 2 is a detail view of the forward end or throat of the digger, the shovel being shown in central vertical section and the forward end being shown in its inner face in side elevation; Fig. 3 is a perspective view of one of the forward end castings; Fig. 4 is a section on the line *a—a* Fig. 2; Fig. 5 is a section on the line *b—b* Fig. 2; and Figs. 6, 7 and 8 are sections on the lines *c—c*, *d—d* and *e—e*, respectively, of Fig. 2.

The invention is shown as embodied in a potato digger of that type having a pair of ground wheels 1 supporting a suitable frame on which an endless elevator 2 is arranged at an angle to the horizontal to receive the potatoes, dirt and vines collected by a shovel 3 at the forward end of the machine, the elevator acting to separate the dirt from the potatoes and to deliver the potatoes with the vines to any suitable means. Of course, the invention is applicable to machines of other constructions.

In the present embodiment, the frame of the machine comprises a pair of parallel frame bars 4, in the form of angle irons, one arm of each iron being arranged vertically and the other arm horizontally and extending outwardly. At the forward end of these angle bars or frame pieces 4 are arranged suitable castings to both of which the shovel 3 is connected.

Each of the forward end castings is formed on its inner vertical and under faces to provide seats 5 to receive the forward end of one of the angle bars 4 and to permit the vertical face 6 and under face 7 of the casting to lie flush with the outer vertical face and the under face, respectively, of the angle bar 4. At the forward end of the casting, an inwardly and laterally projecting lug 8 is formed and is provided with a seat portion 9 formed with bolt openings 10 to permit the casting to be secured to one side of the shovel 3. The top face of the casting has a forward portion 11 which widens laterally from its forward end, inclines upwardly from the inner vertical wall 6 and inclines upwardly from its forward end until it reaches a rearward face 12 on the casting. The rearward portion 12 forms a continuation of the portion 11, widens laterally and inclines upwardly from the vertical wall 6. At its rear end beyond or in rear of the portion 12, the top face of each casting is provided with a seat 13 to which the forward tapered end of one of the side plates 15 is bolted as at 14.

The side plates 15 have their lower edges resting upon the upper edges of the vertical arms of the angle bars 4, being secured thereto in any suitable manner, and being also secured by bolts 16 to the draft beams 17 which extend upwardly, forwardly, and inwardly to a common connection 18 to which the draft means is secured. The forward ends of these side plates form part of the throat of the digger and, to this end, they are cut so that they taper toward their forward ends, the extreme ends being secured to the castings before described. They are rolled or bulged inwardly throughout their reduced portions from a flat portion at the extreme forward end, inclining outwardly to a flat portion arranged vertically at the rear end of the reduced portion and in proximity to the draft pieces 17. This roll or bulge at the rear end of the throat of the digger is one of the important features of this invention as it presents a convex face to the vines, potatoes and dirt so that no pocket is formed in the throat to collect and pack the material and thus interfere with the free operation of the machine.

From the foregoing it will be seen, that I have provided a throat for potato and other diggers which is so constructed that the vines, dirt and the like find nothing at the forward end thereof to interfere with the free entrance of the material. The side plates 15 and the forward castings form sides which have vertical rear portions and forward portions tapering to the plane of the shovel, the rear portions of the tapered portions, that is, in this instance, the forward ends of the side plates, bulge inwardly and incline outwardly, whereas the forward ends of the tapered portions, that is, in this instance, the castings incline outwardly, so that material which has entered the throat finds less chance of escaping as it proceeds rearwardly and when it reaches a certain position in the throat, namely the rounded or bulged portion, the material is gradually brought on to the conveyer, for, it will be noted that the forward end of the conveyer extends down into the throat beyond the rounded or convex portion, so that by the time the draft pieces or beams 17 are reached, the throat merges into the side walls of the digger. This arrangement, not only gives ease of action by reason of the forward formation of the throat, but the rounded or convex portion serves to prevent all packing or jamming of the materials.

What I claim as my invention and desire to secure by Letters Patent is:

1. A potato digger having, in combination with a shovel, sides provided with vertical rear portions and forward portions tapering to the plane of the shovel, the rear portions of the said tapered portions bulging inwardly and inclining outwardly gradually from the vertical portion and the forward tapered portions inclining outwardly.

2. In a potato digger, the combination with a shovel, of a pair of tapered pieces secured to the shovel, frame bars secured to the pieces, and side plates having forward tapered portions forming continuations of the pieces.

3. In a potato digger, the combination with a shovel, of a pair of tapered pieces secured to the shovel and having seats at their rear ends, frame bars secured in some of said seats so as to lie flush with faces of the pieces, and side plates supported on said frame bars and having their forward ends tapered and secured in seats of the pieces.

4. In a potato digger, a shovel, pieces secured to the opposite sides of the shovel, and having faces which gradually widen from the shovel and inclined outwardly with reference to the plane of the shovel, frame bars secured to the pieces, and vertical side plates having tapered forward ends secured to the pieces, and gradually inclining outwardly from the vertical portions thereof.

5. In a potato digger, a shovel, pieces secured to the opposite sides of the shovel and each having a forward face gradually widening rearwardly and inclining outwardly and rearwardly with reference to the plane of the shovel and a rearward face gradually widening rearwardly and inclining outwardly, each of said pieces being provided with a seat below said rearward face and with a seat in rear of said rearward face, frame bars each secured to one of the pieces in the seat below the rearward face of said pieces, and vertical side plates having tapered forward ends which gradually incline outwardly and each of which is secured in the seat at the rear of the rearward face of one of the pieces.

6. In a potato digger, a shovel, pieces secured to opposite sides of the shovel and having faces inclining outwardly and widening rearwardly, frame bars secured to said pieces, vertical side plates having tapered forward ends gradually inclining outwardly toward the pieces and secured to the latter, and draft beams secured to the digger in rear of the tapered portions of the side plates.

7. A potato digger having, in combination with a shovel, sides provided with vertical rear portions and forward portions tapering to the plane of the shovel, the rear portions of the said tapered portions bulging inwardly and inclining outwardly gradually from the vertical portion and the forward tapered portions inclining outwardly, and draft means secured entirely to the vertical portions of the sides so that the forward tapered portion is free to permit the free entrance of vines into the digger.

8. A potato digger having, in combination with a shovel, sides provided with vertical rear portions and tapered forward portions, the rear portions of said tapered portions gradually inclining outwardly from the vertical rear portions, the outwardly inclined portion on each side merging into a point at the upper edge of the rear vertical portion and gradually widening toward the shovel, those portions of the side below said outwardly inclined portions being vertical and in a plane with the vertical portion in rear of the tapered portion, and a bulge connecting the outwardlly inclined portion with the vertical portion beneath said outwardly inclined portion.

WILLIAM H. RICE.

Witnesses:
 HAROLD H. SIMMS,
 ADA M. WHITMORE.